(12) United States Patent
Schadler

(10) Patent No.: US 12,385,553 B2
(45) Date of Patent: Aug. 12, 2025

(54) TRANSMISSION DEVICE FOR A VARIABLE DISPLACEMENT DRIVE

(71) Applicant: MAGNA Auteca GmbH, Weiz (AT)

(72) Inventor: Bernhard Hubert Schadler, Gersdorf an der Feistritz (AT)

( * ) Notice: Subject to any disclaimer, the term of this patent is extended or adjusted under 35 U.S.C. 154(b) by 0 days.

(21) Appl. No.: 18/636,076

(22) Filed: Apr. 15, 2024

(65) Prior Publication Data

US 2024/0360895 A1 Oct. 31, 2024

(30) Foreign Application Priority Data

Apr. 27, 2023 (EP) ..................................... 23170291

(51) Int. Cl.
| | |
|---|---|
| *F16H 35/02* | (2006.01) |
| *F16H 27/08* | (2006.01) |
| *F16H 55/17* | (2006.01) |

(52) U.S. Cl.
CPC ............. *F16H 35/02* (2013.01); *F16H 27/08* (2013.01); *F16H 55/17* (2013.01)

(58) Field of Classification Search
CPC ................................. F16H 35/02; F16H 27/08
See application file for complete search history.

(56) References Cited

U.S. PATENT DOCUMENTS

| 3,426,608 | A | | 2/1969 | Loughran et al. | |
|---|---|---|---|---|---|
| 3,650,156 | A | * | 3/1972 | Thomas | G05G 5/04 74/436 |
| 3,813,952 | A | * | 6/1974 | Fehrenbacher | G04B 13/003 74/435 |
| 2006/0137248 | A1 | | 6/2006 | Ichinose | |
| 2007/0039413 | A1 | * | 2/2007 | Baggio | F16H 35/18 74/640 |
| 2015/0033888 | A1 | * | 2/2015 | Kuroda | B65H 3/0607 74/405 |
| 2018/0179003 | A1 | * | 6/2018 | Chino | B65H 3/0669 |
| 2023/0165744 | A1 | * | 6/2023 | Kaiser | A61H 1/0281 601/5 |

FOREIGN PATENT DOCUMENTS

CH 543709 A 10/1973

OTHER PUBLICATIONS

European Search Report for EP23170291.1, mailed on Oct. 10, 2023.

* cited by examiner

*Primary Examiner* — Minnah L Seoh
*Assistant Examiner* — Gregory T Prather
(74) *Attorney, Agent, or Firm* — Jordan IP Law, LLC; Todd A. Vaughn

(57) ABSTRACT

Gear device for an adjustment drive device of a motor vehicle. The gear device includes an input gearwheel and an output gearwheel driven by the input gearwheel. The input gearwheel includes a first gearwheel and a second gearwheel coaxial to and rotationally fixed relative to the first gearwheel. The output gearwheel includes a third gearwheel and a fourth gearwheel coaxial to and rotationally fixed relative to the third gearwheel. The input gearwheel and the output gearwheel are positioned relative to one another such that in a first circumferential region of the input gearwheel, toothing formed on the first gearwheel is to mesh with toothing formed on the third gearwheel, and in a second circumferential region of the input gearwheel, toothing formed on the second gearwheel is to mesh with toothing formed on the fourth gearwheel.

20 Claims, 2 Drawing Sheets

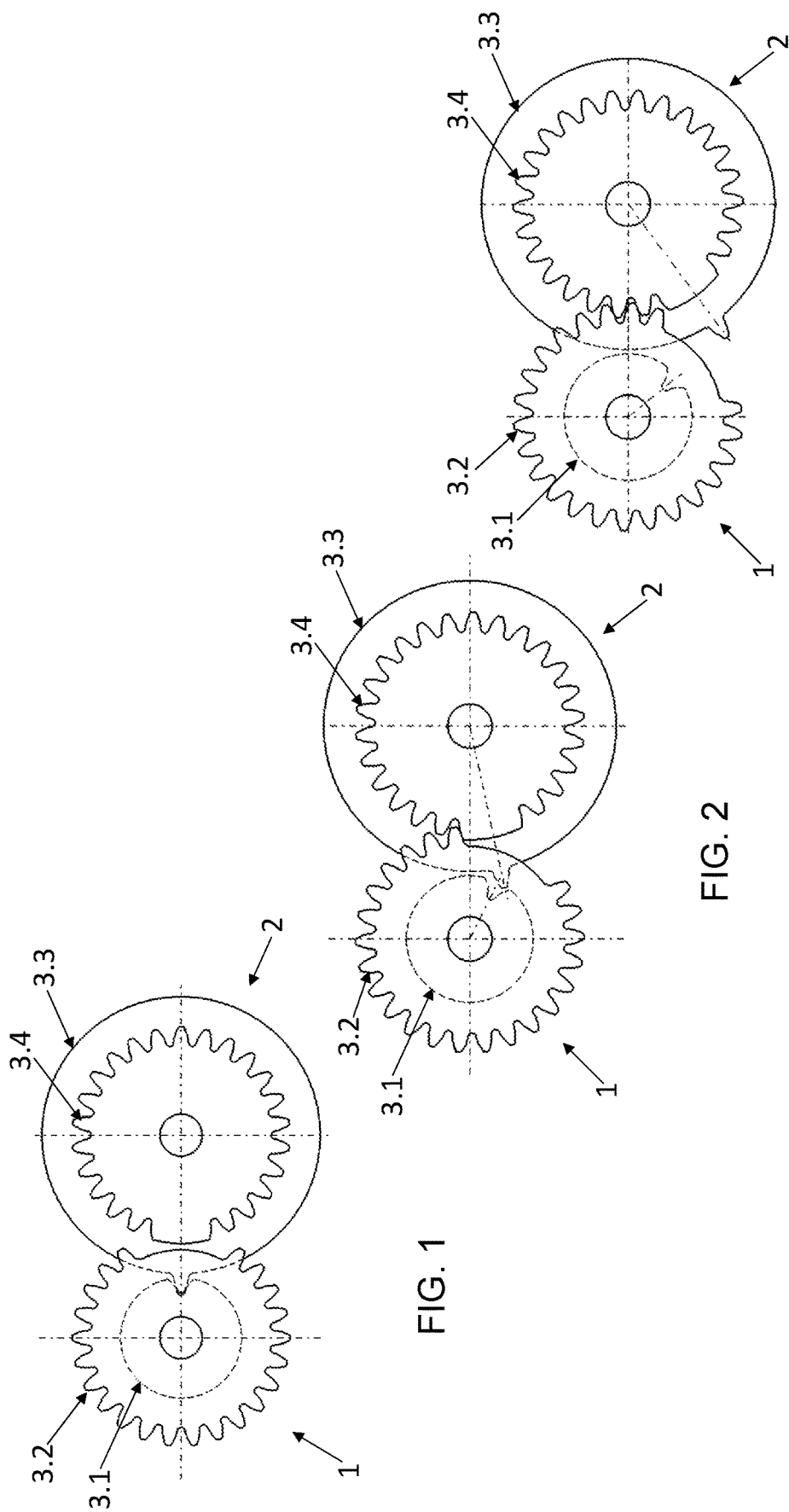

TRANSMISSION DEVICE FOR A VARIABLE DISPLACEMENT DRIVE

CROSS-REFERENCE TO RELATED APPLICATIONS

The present application claims priority under 35 U.S.C. § 119 to European Patent Publication No. EP 23170291.1 (filed on Apr. 27, 2023), which is hereby incorporated by reference in its complete entirety.

TECHNICAL FIELD

The present disclosure concerns a gear device, in particular, for an adjustment drive device in a motor vehicle.

BACKGROUND

It is known to use adjustment drives in motor vehicles, using which an element of the motor vehicle, which can be adjusted from a starting position to a destination position, can be adjusted, usually via an electric motor as a drive and with a suitable gear mechanism. For example, in this way flaps or valves can be opened and closed.

In many electric adjustment drives, a hydraulic moment is required in conjunction with an adjustment time for releasing or closing a mechanism. in particular, in the exterior sector, there is often a need to overcome icing or adhesions in order to guarantee adjustment. This is usually achieved by a corresponding motor in combination with a gear mechanism.

The motor-gear combination of such a drive must be designed for the necessary maximum torque in conjunction with the required adjustment time. Usually, this leads to a larger dimensioning of the motor.

SUMMARY

It is an object of the present disclosure to indicate a gear device, in particular, for an adjustment drive in a motor vehicle. The adjustment drive avoids the above-described problems, and can be operated efficiently and/or constructed compactly. It is a further object to indicate such a drive device.

The object is achieved by a gear device, in particular, for an adjustment drive in a motor vehicle, comprising an input gearwheel which can be driven by the motor, and an output gearwheel which meshes with the input gearwheel and hence can be driven by the input gearwheel, wherein the input gearwheel is configured as a double gearwheel, so that the input gearwheel comprises a first gearwheel and a second gearwheel coaxial to and rotationally fixed relative to the first gearwheel, wherein the first gearwheel has a smaller circumference than the second gearwheel; wherein the output gearwheel is configured as a double gearwheel so that the output gearwheel comprises a third gearwheel and a fourth gearwheel coaxial to and rotationally fixed relative to the third gearwheel, wherein the third gearwheel has a larger circumference than the fourth gearwheel; wherein the input gearwheel and the output gearwheel are configured and positioned relative to one another such that in a first circumferential region of the input gearwheel, a toothing is formed on the first gearwheel which meshes with a toothing of the third gearwheel, and in a second circumferential region of the input gearwheel, a toothing is formed on the second gearwheel which meshes with a toothing of the fourth gearwheel, so that the translation ratio between the input gearwheel and the output gearwheel in the first circumferential region is different from that in the second circumferential region.

According to the disclosure therefore, a gear device is provided which uses two double gearwheels as the input and output gearwheels. The two gearwheels of each double gearwheel are rotationally fixed relative to one another, preferably formed of one piece and have a common axis, preferably a common bore in the common centre of the two gearwheels. In each case, one the gearwheels is larger than the other of the two gearwheels of a double gearwheel. The input gearwheel and the output gearwheel are fixedly positioned relative to one another. The smaller gearwheel of the input gearwheel is arranged opposite the larger gearwheel of the output gearwheel, and conversely the larger gearwheel of the input gearwheel is arranged opposite the smaller gearwheel of the output gearwheel. The pitch circle radius of the first gearwheel and third gearwheel together corresponds to the pitch circle radius of the second gearwheel and fourth gearwheel together, so that because of the size ratios and the fixed positioning of the double gearwheels, in principle in each case both gearwheels of the input gearwheel would be in engagement with both gearwheels of the output wheel.

According to the present disclosure, however, all gearwheels have at least two differently formed sectors in the circumferential direction. In one of the sectors, namely in the first circumferential region of the input gearwheel, a toothing is formed on the first gearwheel. Correspondingly, a toothing, namely of the third gearwheel which meshes with the first gearwheel in the first circumferential region, is also formed on a circumferential region of the output gearwheel which meshes with the first circumferential region of the first gearwheel. In this first circumferential region, only the first gearwheel and the third gearwheel are in engagement with one another, not the second gearwheel and the fourth gearwheel. In another, preferably complementary sector, namely in the second circumferential region of the input gearwheel, a toothing is formed on the second gearwheel. Correspondingly, a toothing, namely of the fourth gearwheel which meshes with the second gearwheel in the second circumferential region, is formed on a circumferential region of the output gearwheel which meshes with the second circumferential region of the second gearwheel. In this second circumferential region, only the second gearwheel and the fourth gearwheel are in engagement with one another, not the first gearwheel and the third gearwheel.

The two sectors in the circumferential direction, i.e., the two circumferential regions, therefore, have mutually different translation ratios. The gear device thus forms a gear stage with two different, discrete ratios.

By use of such a gear device, a higher translation ratio can be provided from the start of the drive, in particular, from the start of an adjustment, and a high output moment can be achieved. To ensure a desired short adjustment time, after a predefined rotational angle, on transition from the first circumferential region to the second circumferential region, the translation ratio is reduced and hence the speed increased.

With the two separate translation ratios, therefore, the motor power can be reduced since the requirement for a high starting moment can be fulfilled via the gear mechanism. This brings advantages with respect to cost and space requirement, and achieves as great an adjustment range as possible with constant translation ratio.

Preferably, in the first circumferential region of the input gearwheel, no toothing is formed on the second gearwheel and/or no toothing is formed on the fourth gearwheel. In the second circumferential region of the input gearwheel, preferably no toothing is formed on the first gearwheel and/or no toothing is formed on the third gearwheel.

Preferably, the second circumferential region extends over a larger circumferential region of the input gearwheel than the first circumferential region, preferably over at least half, particularly preferably over at least three-quarters of the circumference of the input gearwheel.

Preferably, the toothing in the first circumferential region comprises solely one tooth on the first gearwheel or on the third gearwheel, and correspondingly one groove meshing therewith on the third gearwheel or on the first gearwheel.

Preferably, the input gearwheel and accordingly also the output gearwheel comprise only the first circumferential region and the second circumferential region and no further different circumferential regions. The first circumferential region and the second circumferential region preferably extend over at least substantially the entire circumference of the input and output gearwheels.

Preferably, the first gearwheel is formed smaller than the third gearwheel and the fourth gearwheel. Preferably, the third gearwheel is formed larger than the first gearwheel and the second gearwheel. Preferably, the second gearwheel is formed approximately the same size as the fourth gearwheel so that a ratio of 1:1 exists between the second gearwheel and the fourth gearwheel.

The object is also achieved by a drive device, in particular, an adjustment drive, comprising a motor and a gear device as described above, wherein the input gearwheel is configured such that it can be driven by the motor, wherein the output gearwheel can be driven by the input gearwheel.

The input gearwheel can preferably be driven directly by a toothing on a motor shaft of the motor, or is formed on a motor shaft of the motor.

Preferably, the motor, input gearwheel and output gearwheel are configured such that the first circumferential region of the input gearwheel is active at a starting position of the motor, in particular, at a rest position of the adjustment drive. Then the second circumferential region of the input gearwheel is active on the path to a proposed end position of the drive and at the end position, in particular, at an adjustment position of the adjustment drive.

The word "active" here means in engagement with one another, i.e., the toothing mesh in a respective circumferential region.

DRAWINGS

The disclosure is described below as an example with reference to the drawings.

FIG. 1 shows a side view of a gear device according to the present disclosure in a state with an active first circumferential region.

FIG. 2 shows a side view of the gear device of FIG. 1 on transition of activity from a first circumferential region to a second circumferential region.

FIG. 3 shows a side view of the gear device of FIG. 1 in a state with an active second circumferential region.

DESCRIPTION

Figure 4:
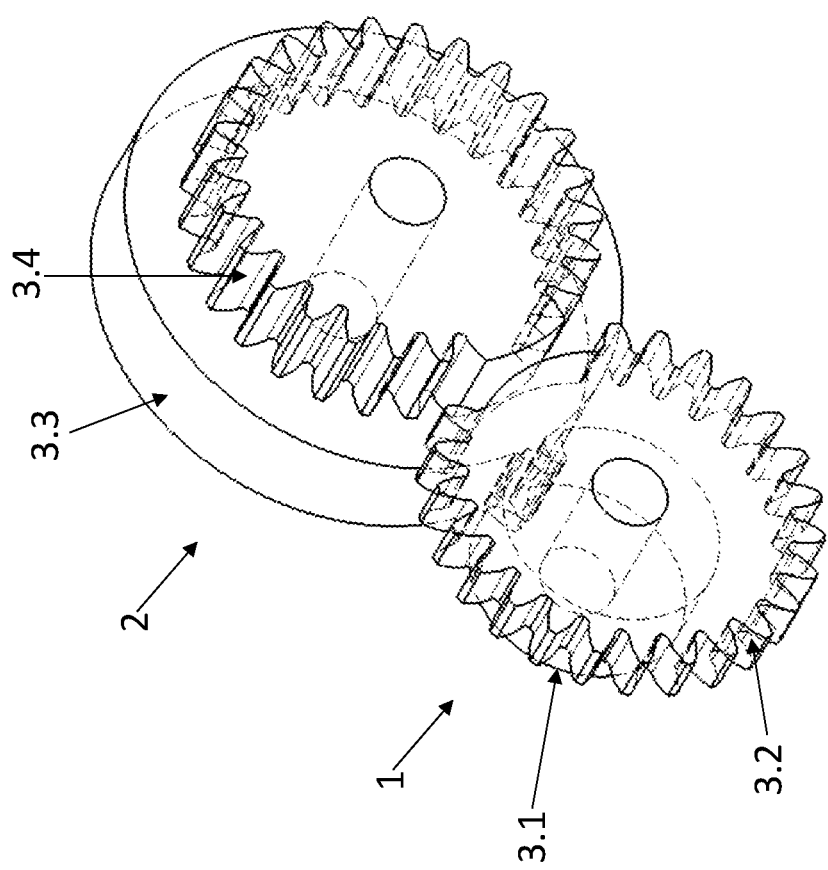
FIG. 4 is a three-dimensional illustration of the gear device of FIG. 1.

FIGS. 1 and 4 show a gear device according to the present disclosure in a first state, in which the input gearwheel 1 meshes with the output gearwheel 2 in a first circumferential region, and hence the first circumferential region is active.

The first circumferential region of the input gearwheel 1 is in meshing engagement with an assigned first circumferential region of the output gearwheel 2. In the embodiment shown, the first circumferential region has only one groove on the first gearwheel 3.1 and one tooth on the third gearwheel 3.3.

The gear device, which is configured as a gear stage for an adjustment drive in a motor vehicle, comprises an input gearwheel 1 which can be driven by a motor of the adjustment drive, and an output gearwheel 2 which meshes with the input gearwheel 1 and hence can be driven by the input gearwheel 1.

The input gearwheel 1 is configured as a double gearwheel so that the input gearwheel 1 comprises a first gearwheel 3.1 and a second gearwheel 3.2 coaxial to and rotationally fixed relative to the first gearwheel 3.1. The first gearwheel 3.1 has a smaller circumference than the second gearwheel 3.2.

The output gearwheel 2 is also configured as a double gearwheel so that the output gearwheel 2 comprises a third gearwheel 3.3 and a fourth gearwheel 3.4 coaxial to and rotationally fixed relative to the third gearwheel 3.3. The third gearwheel 3.3 has a larger circumference than the fourth gearwheel 3.4.

The first gearwheel 3.1 is formed smaller than the third gearwheel 3.3. and the fourth gearwheel 3.4 and the third gearwheel 3.3 is formed larger than the first gearwheel and the second gearwheel 3.1, 3.2. The second gearwheel 3.2 is formed approximately the same size as the fourth gearwheel 3.4. The pitch circle radius of the first gearwheel 3.1 and the third gearwheel 3.1 together corresponds to the pitch circle radius of the second gearwheel 3.2 and the fourth gearwheel 3.4.

The input gearwheel 1 and the output gearwheel 2 are configured and positioned relative to one another such that in a first circumferential region of the input gearwheel 1, a toothing is formed on the first gearwheel 3.1 which meshes with a toothing of the third gearwheel 3.3, as described hereinabove and shown in FIG. 1. In the first circumferential region of the input gearwheel 1, no toothing is formed on the second gearwheel 3.2 and no toothing is formed on the fourth gearwheel 3.4. In each case, the second gearwheel 3.2 and the fourth gearwheel 3.4 in the first circumferential region of the input gearwheel 1 and output gearwheel 2 are configured such that they do not mesh, i.e., are not in engagement, so that these gearwheels do not block the transmission of torque from the first gearwheel 3.1 to the third gearwheel 3.3.

In a second circumferential region of the input gearwheel 1, a toothing is formed on the second gearwheel 3.2 which meshes with a toothing of the fourth gearwheel 3.4. This state is shown in FIG. 3. In the second circumferential region of the input gearwheel 1, no toothing is formed on the first gearwheel 3.1 and no toothing is formed on the third gearwheel 3.3. In any case, the first gearwheel 3.1 and the third gearwheel 3.3 in the second circumferential region of the input gearwheel 1 and output gearwheel 2 are configured such that they do not mesh, i.e., are not in engagement, so that these gearwheels do not block the transmission of torque from the second gearwheel 3.2 to the fourth gearwheel 3.4.

FIG. 2 shows the transition from the first circumferential region to the second circumferential region. The translation ratio between the input gearwheel 1 and the output gearwheel 2 in the first circumferential region is different from that in the second circumferential region, namely a discrete, different translation ratio.

The second circumferential region extends over a larger circumferential region of the input gearwheel 1 than the first circumferential region, namely over at least three-quarters of the circumference of the input gearwheel 1.

The toothing in the first circumferential region comprises solely one tooth on the third gearwheel 3.3, and correspondingly one groove meshing therewith on the first gearwheel 3.1. This toothing in the first circumferential region is used for example solely for the starting region of an adjustment drive. After the start of the drive, a higher translation ratio can be established and a high output moment achieved. After a predefined rotational angle, on transition from the first circumferential region to the second circumferential region, the translation ratio is reduced and hence the speed increased.

LIST OF REFERENCE SYMBOLS

1 Input gearwheel
2 Output gearwheel
3.1 First gearwheel
3.2 Second gearwheel
3.3 Third gearwheel
3.4 Fourth gearwheel

What is claimed is:

1. A gear device, for an adjustment drive device of a motor vehicle, the gear device comprising:
an input gearwheel to be driven by a motor, the input gearwheel including a double gearwheel having a first gearwheel and a second gearwheel coaxial to and rotationally fixed relative to the first gearwheel, the first gearwheel having a circumference that is less than a circumference of the second gearwheel; and
an output gearwheel operable to mesh with the input gearwheel so as to be driven by the input gearwheel, the output gearwheel including a double gearwheel having a third gearwheel and a fourth gearwheel coaxial to and rotationally fixed relative to the third gearwheel, the third gearwheel having a circumference that is greater than a circumference of the fourth gearwheel,
wherein the input gearwheel and the output gearwheel are positioned relative to one another such that:
in a first circumferential region of the input gearwheel, toothing formed on the first gearwheel comprises solely one tooth that is to mesh with toothing formed on the third gearwheel, the toothing on the third gearwheel comprising solely one groove meshing therewith,
in a second circumferential region of the input gearwheel, toothing formed on the second gearwheel is to mesh with toothing formed on the fourth gearwheel, the second circumferential region extending over at least one-half of the circumference of the input gearwheel, and
a translation ratio between the input gearwheel and the output gearwheel in the first circumferential region is different than a translation ratio between the input gearwheel and the output gearwheel in the second circumferential region.

2. The gear device of claim 1, wherein in the first circumferential region of the input gearwheel,
no toothing is formed on the fourth gearwheel.

3. The gear device of claim 2, wherein in the second circumferential region of the input gearwheel,
no toothing is formed on the first gearwheel.

4. The gear device of claim 1, wherein the circumference of the first gearwheel is less than the circumference of the third gearwheel and the circumference of the fourth gearwheel.

5. The gear device of claim 4, wherein the circumference of the third gearwheel is greater than the circumference of the first gearwheel and the circumference of the second gearwheel.

6. The gear device of claim 4, wherein the circumference of the second gearwheel is approximately a same size as the circumference of the fourth gearwheel.

7. The gear device of claim 1, wherein the first circumferential region of the input gearwheel is in meshing engagement with a first circumferential region of the output gearwheel.

8. The gear device of claim 1, wherein a pitch circle radius of the first gearwheel and the third gearwheel together correspond to a pitch circle radius of the second gearwheel and the fourth gearwheel.

9. An adjustment drive device, comprising:
a motor; and
a gear device that includes:
an input gearwheel, to be driven by the motor, the input gearwheel including a double gearwheel having a first gearwheel and a second gearwheel coaxial to and rotationally fixed relative to the first gearwheel, the first gearwheel having a circumference that is less than a circumference of the second gearwheel, and
an output gearwheel operable to mesh with the input gearwheel so as to be driven by the input gearwheel, the output gearwheel including a double gearwheel having a third gearwheel and a fourth gearwheel coaxial to and rotationally fixed relative to the third gearwheel, the third gearwheel having a circumference that is greater than a circumference of the fourth gearwheel, and
wherein the input gearwheel and the output gearwheel are positioned relative to one another such that in a first circumferential region of the input gearwheel, a toothing is formed on the first gearwheel which comprises solely one tooth that meshes with a toothing of the third gearwheel, the toothing on the third gearwheel comprising solely one groove meshing therewith; and in a second circumferential region of the input gearwheel, a toothing is formed on the second gearwheel which meshes with a toothing of the fourth gearwheel, the second circumferential region extending over at least one-half of the circumference of the input gearwheel; so that a translation ratio between the input gearwheel and the output gearwheel in the first circumferential region is different from a translation ratio between the input gearwheel and the output gearwheel in the second circumferential region.

10. The adjustment drive device of claim 9, wherein the input gearwheel is driven directly by toothing on a motor shaft of the motor.

11. The adjustment drive device of claim 9, wherein the input gearwheel is formed on a motor shaft of the motor.

12. The adjustment drive device of claim 9, wherein:
the input gearwheel is configured such that the first circumferential region of the input gearwheel is in an active operating state at a starting position of the motor, and
the adjustment drive device is configured to be at a rest position in the starting position of the motor.

13. The adjustment drive device of claim 9, wherein:
the input gearwheel is configured such that the second circumferential region of the input gearwheel is in an active operating state at an end position of the motor, and
the adjustment drive device is configured to be at an adjustment position in the end position of the motor.

14. The adjustment drive device of claim 9, wherein in the first circumferential region of the input gearwheel:
no toothing is formed on the fourth gearwheel.

15. The adjustment drive device of claim 14, wherein in the second circumferential region of the input gearwheel,
no toothing is formed on the first gearwheel.

16. The adjustment drive device of claim 9, wherein the first circumferential region of the input gearwheel is in meshing engagement with a first circumferential region of the output gearwheel.

17. The adjustment drive device of claim 9, wherein a pitch circle radius of the first gearwheel and the third gearwheel together correspond to a pitch circle radius of the second gearwheel and the fourth gearwheel.

18. A gear device for a motor vehicle, the gear device comprising:
an input gearwheel to be driven by a motor, the input gearwheel including a first gearwheel and a second gearwheel coaxial to and rotationally fixed relative to the first gearwheel, the first gearwheel having a circumference that is less than a circumference of the second gearwheel; and
an output gearwheel to be driven by the input gearwheel, the output gearwheel including a third gearwheel and a fourth gearwheel coaxial to and rotationally fixed relative to the third gearwheel, the third gearwheel having a circumference that is greater than a circumference of the fourth gearwheel,
wherein the input gearwheel and the output gearwheel are positioned relative to one another such that:
in a first circumferential region of the input gearwheel, toothing formed on the first gearwheel comprises solely one tooth that is to mesh with toothing formed on the third gearwheel, the toothing on the third gearwheel comprising solely one groove meshing therewith;
in a second circumferential region of the input gearwheel, toothing formed on the second gearwheel is to mesh with toothing formed on the fourth gearwheel, the second circumferential region extending over at least one-half of the circumference of the input gearwheel; and
a translation ratio between the input gearwheel and the output gearwheel in the first circumferential region is different than a translation ratio between the input gearwheel and the output gearwheel in the second circumferential region.

19. The gear device of claim 18, wherein the first circumferential region of the input gearwheel is in meshing engagement with a first circumferential region of the output gearwheel.

20. The gear device of claim 18, wherein a pitch circle radius of the first gearwheel and the third gearwheel together correspond to a pitch circle radius of the second gearwheel and the fourth gearwheel.

\* \* \* \* \*